(12) United States Patent
Sung

(10) Patent No.: US 11,622,304 B1
(45) Date of Patent: Apr. 4, 2023

(54) PREFERRED PCELL MODE SUPPORT IN 4G AND 5G CELLULAR NETWORK

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/368,241

(22) Filed: Jul. 6, 2021

(51) Int. Cl.
*H04W 36/00* (2009.01)
*H04W 36/14* (2009.01)
*H04W 36/08* (2009.01)

(52) U.S. Cl.
CPC ..... *H04W 36/00835* (2018.08); *H04W 36/08* (2013.01); *H04W 36/14* (2013.01)

(58) Field of Classification Search
CPC ............. H04W 36/00; H04W 36/0083; H04W 36/00835; H04W 36/00837; H04W 36/04; H04W 36/08; H04W 36/14; H04W 36/16; H04W 36/165; H04W 36/18; H04W 36/22; H04W 36/24; H04W 36/26; H04W 36/28; H04W 36/34; H04W 36/38; H04W 36/385

See application file for complete search history.

(56) References Cited

U.S. PATENT DOCUMENTS

| | | | | |
|---|---|---|---|---|
| 2017/0311206 | A1* | 10/2017 | Ryoo | H04W 88/08 |
| 2020/0236596 | A1* | 7/2020 | Liu | H04W 76/27 |
| 2020/0280971 | A1* | 9/2020 | Moon | H04L 5/0094 |

* cited by examiner

*Primary Examiner* — Matthew W Genack
(74) *Attorney, Agent, or Firm* — Shook, Hardy & Bacon L.L.P.

(57) ABSTRACT

Systems and methods are provided for supporting a preferred cell mode of a telecommunications network includes a user device and a cell site. The cell site includes a cell mode system communicatively coupled to the user device. The cell mode system is structured to receive a preferred cell mode request and a management notification, generate a cell switch request based on the preferred cell mode request and the management notification, receive a cell switch confirmation based on the cell switch request, and provide a handoff request responsive to the cell switch confirmation. The handoff request is structured to initiate the handoff of the user device to at least one preferred cell, the at least one preferred cell structured to adjust an uplink data speed.

20 Claims, 5 Drawing Sheets

"PREFERRED PCELL MODE SUPPORT IN 4G AND 5G CELLULAR NETWORK"

SUMMARY

The present disclosure is directed, in part, to supporting a preferred cell mode of a telecommunications network, substantially as shown in and/or described in connection with at least one of the figures, and as set forth more completely in the claims.

In aspects set forth herein, a preferred cell mode request and a management notification are received. Typically, carrier aggregation is utilized to assign multiple frequency bands to a user device. As more frequency bands are assigned to the user device, the data rate increases. However, here, a handoff request is provided responsive to a cell switch confirmation, which initiates the handoff of the user device to at least one preferred cell that adjusts an uplink data speed.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for supporting a preferred cell mode of a telecommunications network (e.g., a 4G network, EN-DC network, 5G New Radio network, or any other suitable network). A preferred cell mode request and a management notification are received. A cell switch request is generated based on the preferred cell mode request and the management notification. A cell switch confirmation is received based on the cell switch request. A handoff request is provided responsive to the cell switch confirmation, which initiates the handoff of the user device to at least one preferred cell that adjusts an uplink data speed.

Advantageously, providing methods and systems for supporting a preferred cell mode of a user device operable via a telecommunications network by providing a handoff request responsive to a cell switch confirmation adjusts (e.g., increases) the uplink data speed and/or the downlink data speed of the user device.

In one aspect, a method is provided for supporting a preferred cell mode of a user device operable via a telecommunications network. The method includes receiving, by a cell mode system communicatively coupled to a user device, a preferred cell mode request and a management notification. The method also includes generating a cell switch request based on the preferred cell mode request and the management notification. The method further includes receiving a cell switch confirmation based on the cell switch request. The method further includes providing a handoff request responsive to the cell switch confirmation.

In another aspect, a computer-readable storage media having computer-executable instructions embodied thereon is provided that, when executed by one or more processors, cause the processors to perform various steps. The processors are caused to receive, by one or more user devices communicatively coupled to a cell mode system, a candidate list comprising one or more carriers, the one or more carriers corresponding to one or more cells. The processors are also caused to determine at least one preferred cell based on the candidate list, the at least one preferred cell structured to adjust an uplink data speed. The processors are further caused to determine whether a first preferred cell from the at least one preferred cell matches a current cell. The processors are further caused to generate a management notification corresponding to the first preferred cell if the first preferred cell does not match the current cell. The processors are further caused to transmit the management notification and a preferred cell mode request, wherein the preferred cell mode request includes the first preferred cell.

In yet another aspect, a system is provided for supporting a preferred cell mode of a telecommunications network. The system includes a user device and a cell site comprising a cell mode system communicatively coupled to the user device. The cell site receives a preferred cell mode request and a management notification. The cell site also generates a cell switch request based on the preferred cell mode request and the management notification. The cell site further receives a cell switch confirmation based on the cell switch request. The cell site further provides a handoff request responsive to the cell switch confirmation, wherein the handoff request is structured to initiate the handoff of the user device to at least one preferred cell, the at least one preferred cell structured to adjust an uplink data speed.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

The terms "network" and "telecommunication network" may be used interchangeably herein to refer to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
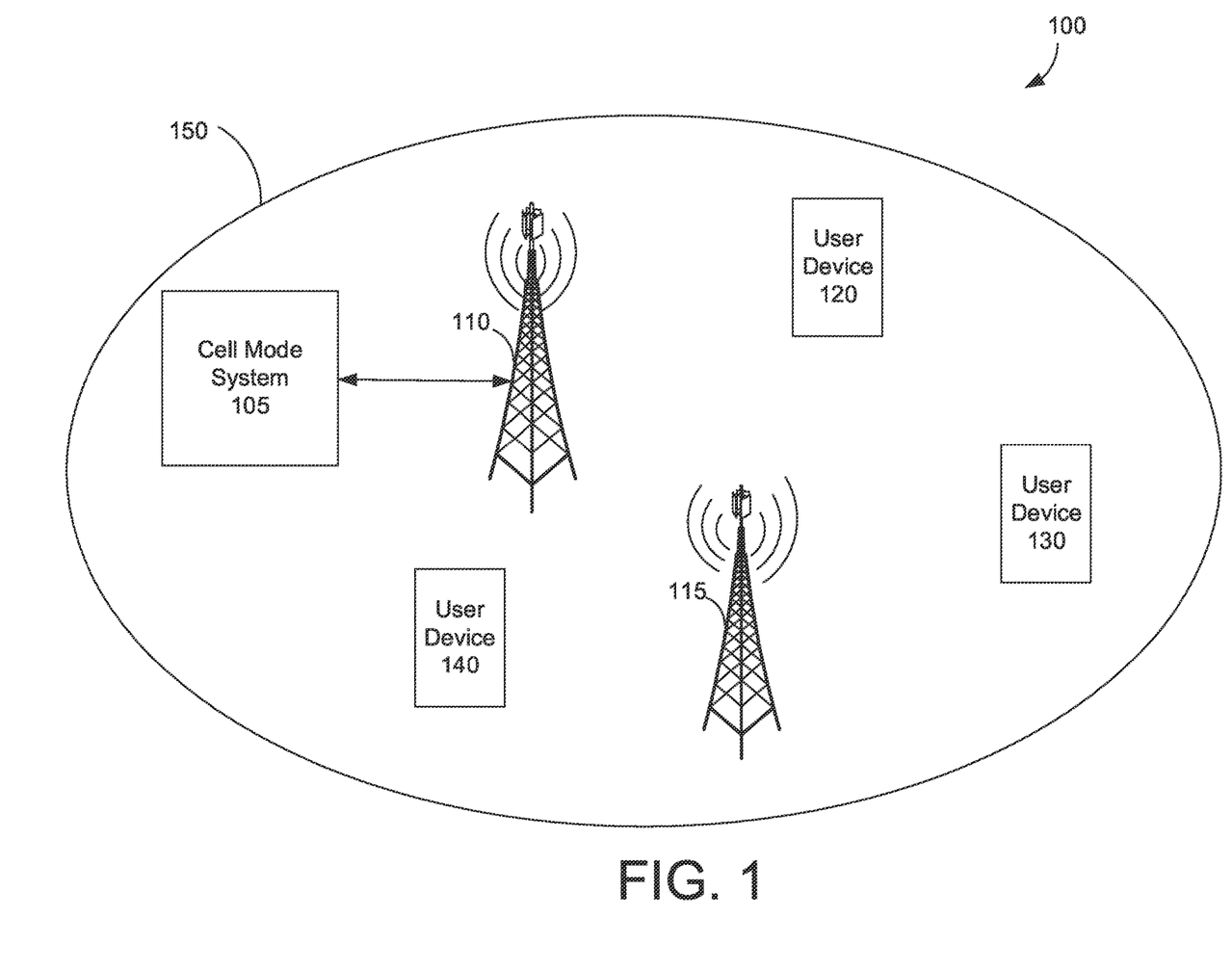
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120, 130, and 140. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through one or more cell sites 110, 115. The cell site may include one or more antennas, base transmitter stations, radios, transmitter/receivers, digital signal processors, control electronics, GPS equipment, power cabinets or power supply, base stations, charging stations, etc. such that the cell site (e.g., the cell site 110, 115) may provide a communication link between the one or more user devices 105, 130, and 140 and other components, systems, equipment, and/or devices of the network environment 100. The base station and/or a computing device (e.g., whether local or remote) associated with the base station may manage or otherwise control the operations of components of the cell site.

In some embodiments, the cell site 110, 115 may be operable in a non-stand alone (NSA) mode. In the non-stand alone mode the network environment 100 may take the form of, for example, an E-UTRAN New Radio-Dual Connectivity (EN-DC) network. In an EN-DC network, a user device (e.g., the user device 120, 130, and/or 140) may connect to or otherwise access a 4G, LTE, 5G, or any other suitable network simultaneously. In the stand alone mode, the network environment 100 may take the form of a 5G network or any other suitable network.

In some embodiments, the network environment 100 may include a cell mode system (e.g., the cell mode system 105). The cell mode system may include one or more nodes communicatively coupled to the user device(s) 120, 130, and/or 140 such that the cell mode system may be structured to transmit to and receive requests and/or data from one or more user devices. The one or more nodes may include an Evolved Node B (e.g., eNodeB or eNB), a Next Generation Node B (e.g., gNodeB or gNB), a combination thereof, or any other suitable node structured to communicatively couple to the user device(s) 120, 130, and/or 140.

In some embodiments, the user device 120, 130, and/or 140 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may be structured to connect subscribers to a service provider or a plurality of service providers. Alternatively or additionally, the network environment 100 may be associated with a specific telecommunication provider that provides services (e.g. LTE, voice, location, etc.) to one or more user devices 120, 130, and/or 140. For example, the user devices 120, 130, and 140 may be subscribers to a telecommunication service provider, in which the user devices 120, 130, and 140 are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
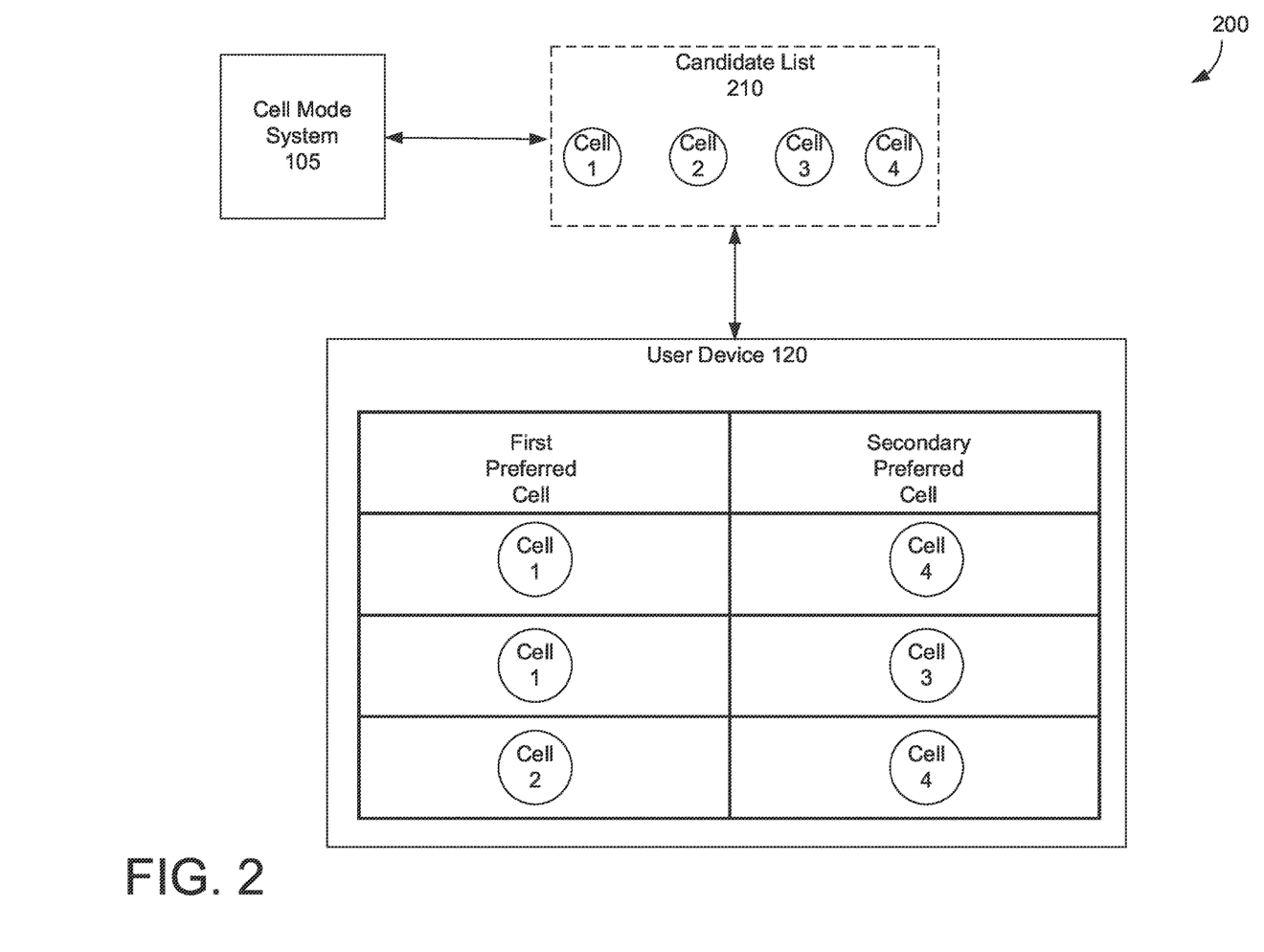
FIG. 2 is a diagram of a network environment including a user device and cell mode system in accordance with an example embodiment.

FIG. 2 is a diagram of the network environment 200 (e.g., a telecommunication network such as, but not limited to, a wireless telecommunication network) according to an example embodiment. In the present embodiment, the network environment 200 includes the cell mode system 105, user device 120, candidate list 210, one or more first preferred cells 1 and 2, and one or more secondary preferred cells 3 and 4. Although some of the components in the network environment 200 are depicted as single components (e.g., a single user device or cell mode system), in some embodiments, the network environment 200 may include a plurality of such components from 1 to N.

In some examples, the user device 120 may be structured to receive a candidate list (e.g., the candidate list 210). The candidate list may include one or more carriers. The one or more carriers may correspond to one or more cells. The carriers may be aggregated such that one or more frequency bands and/or frequency blocks may be allocated to a user device. Advantageously, the data rate of the user device (e.g., the user device 120) increases as more frequency bands and/or frequency blocks are allocated to the user device.

In some embodiments, the one or more user devices (e.g., the user devices 120, 130, and/or 140) may be communicatively coupled to the cell mode system 105 (e.g., gNodeB or eNodeB) such that the cell mode system 105 may transmit, broadcast, or otherwise provide the candidate list 210 (e.g., a carrier aggregation (CA) candidate list) to the one or more user devices. In some examples, the cell mode system 105 may transmit, broadcast, or otherwise provide a single candidate list or a plurality of candidate lists that correspond to one or more telecommunication networks such as, but not limited to, a 4G, LTE, 5G, or any other suitable network simultaneously, in real-time, and/or in near real-time. In some embodiments, the cell mode system 105 may transmit, broadcast, or otherwise provide a System Information Message (SIB) that includes the candidate list (e.g., a carrier aggregation (CA) candidate list) such that the user device 120 may receive the System Information Message that includes the carrier list transmitted.

In some embodiments, the cell mode system 105 (e.g., eNodeB or gNodeB) may be communicatively coupled to the user device(s) such that any user device within a geographic area may receive or otherwise may retrieve the candidate list from the cell mode system 105. For example, the user device 120 may receive the candidate list 210 from the cell mode system 105. In this regard, the cell mode system 105 may report the candidate list 210 that includes cell 1, cell 2, cell 3, and cell 4 to the user device 120. Alternatively or additionally, the user device 120 may retrieve the candidate list that includes cell 1, cell 2, cell 3, and cell 4 from the cell mode system 105.

The user device 120 may determine at least one preferred cell (e.g., a preferred pCell request) based on the candidate list 210. As used herein, the term "preferred cell" may be used to refer to a cell (e.g., pCell, sCell, or any other suitable cell) that may be prioritized or otherwise preferred by one or more user devices. The preferred cell may adjust one or more parameters associated with the user device(s) (e.g., the user device 120). For example, the preferred cell may adjust an uplink data speed, downlink data speed, or any other suitable parameter associated with the user device(s).

In some examples, the user device 120 may utilize the cell (e.g., the pCell) of Carrier A and/or the cell (e.g., the sCell) of Carrier B. Carrier A may, for example, provide higher downlink data speed due to wider channel bandwidth, beamforming, etc. such that the cell (e.g., the pCell) of Carrier A may be the preferred cell for user device(s) undergoing or experiencing heavy downlink data traffic. Alternatively or additionally, the cell of Carrier B may provide higher uplink data speed to the user device(s) due to wider channel bandwidth and less utilization of resource blocks (RBs) such that the cell (e.g., the pCell) of Carrier B may be the preferred cell for user device(s) undergoing or experiencing heavy uplink data traffic.

In some embodiments, the cell (e.g., the pCell) of a carrier (e.g., Carrier A) may provide PDCCH (Physical Downlink Control Channel) link reliability due to a lower frequency band. In this regard, the cell (e.g., the pCell) of such carrier(s) (e.g., Carrier A) may be the preferred cell for user device(s) undergoing or experiencing high PDCCH Block Error Rate (BLER). The cell (e.g., the pCell) of a carrier (e.g., Carrier B), in some examples, may provide higher data speed due to wider channel bandwidth and less utilization of RBs. Carrier B may be the preferred cell for user device(s) undergoing or experiencing heavy data traffic without high PDCCH BLER. Accordingly, the preferred cell of each user device may be different because of the capability, RF link reliability, etc. of each user device. Advantageously, the user device selects the preferred cell that is capable of best meeting the needs of the user device.

In some embodiments, the user device 120 may be connected, via a Radio Resource Control (RRC) protocol, to the cell mode system 105. The user device 120 may determine (e.g., calculate) its preferred cell based on the candidate list (e.g., the candidate list 210). As illustrated in FIG. 2, the user device 120 determined cell 1 is the preferred cell of the user device 120 based on the candidate list 210 that includes the cells 1-4. In some embodiments, the user device(s) may determine a plurality of preferred cells (e.g., the first preferred cell 1 and the secondary preferred cell 4). The user device(s) may calculate its preferred cell based on the candidate list periodically, responsive to one or more events, etc.

The user device 120 may determine whether there has been a preferred cell update within a period of time. For example, the user device 120 may determine whether there has been a preferred cell update while a timer is active. If the timer is active or otherwise has not expired, the user device 120 may repeatedly determine whether there has been a preferred cell update.

In some examples, if the timer has expired or is otherwise inactive, the user device 120 may determine whether a first preferred cell (e.g., the first preferred cell 1) from the at least one preferred cell matches a current cell (e.g., cell 1). In this regard, the user device 120 may compare the first preferred cell with the current cell. If the first preferred cell matches the current cell, the user device 120 may again determine whether there has been a preferred cell update while the timer is active.

The user device 120 may generate a management notification (e.g., measurement report) corresponding to the first preferred cell if the first preferred cell does not match the current cell. For example, as shown the first preferred cell changed from cell 1 to cell 2. Since the first preferred cell (e.g., the first preferred cell 2) does not match the current cell (e.g., cell 1), the user device 120 may generate a management notification (e.g., a measurement report). The management notification may include one or more radio frequency measurements such as the Reference Signal Received Power (RSRP), Reference Signal Received Quality (RSRQ), Receive Strength Signal Indicator (RSSI), Signal-to-Interference-Plus-Noise Ratio (SINR), or any other signal measurement of the preferred cell (e.g., the preferred pCell).

The user device 120 may provide or otherwise transmit the measurement notification (e.g., a measurement report), preferred cell mode request, or a combination thereof. The preferred cell mode request may include the first preferred cell (e.g., the cell 2). In some embodiments, the user device 120 may provide, via a signal protocol (e.g., radio resource control (RRC) signaling), the measurement notification (e.g., a measurement report), the preferred cell mode request (e.g., preferred pCell), or a combination thereof to the cell mode system 105. Alternatively or additionally, the preferred cell mode request may include a secondary preferred cell (e.g., the cell 4). The term "secondary preferred cell" may be used herein to refer to a secondary most preferred cell (e.g., a secondary pCell). In examples wherein the preferred cell mode includes a secondary preferred cell, the user device 120 may be handed off to the secondary preferred cell in response to a cell switch rejection provided by the first preferred cell.

Figure 3:
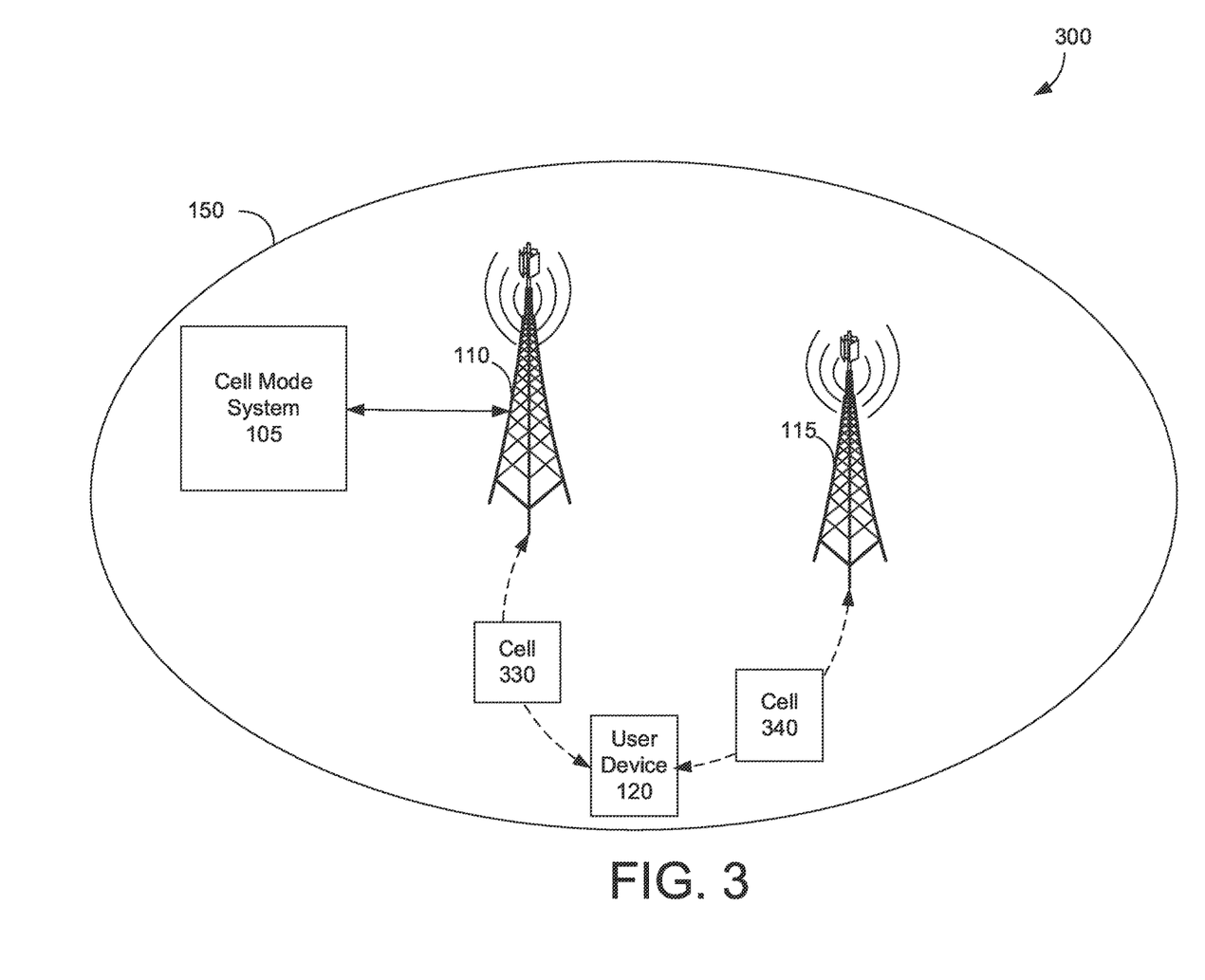
FIG. 3 is a diagram of a network environment including a plurality of cell sites and a cell mode system in accordance with an example embodiment.

FIG. 3 is a diagram of the network environment 300 (e.g., a telecommunication network such as, but not limited to, a wireless telecommunication network) according to an example embodiment. In the present embodiment, the network environment 300 includes the cell mode system 105, cell site 110 and 115, user device 120, geographic area 150, and one or more cells 330 and 340. Although some of the components in the network environment 300 are depicted as single components (e.g., a single user device or cell mode system), in some embodiments, the network environment 300 may include a plurality of such components from 1 to N.

In some examples, the cell mode system 105 (e.g., gNodeB or eNodeB) may be communicatively coupled to one or more user devices (e.g., the user device 120). The cell mode system 105 may receive a preferred cell mode request, a management notification, or a combination thereof from one or more user devices within a geographic area (e.g., the geographic area 150). The preferred cell mode request may include at least one preferred cell (e.g., a first preferred cell such as the cell 340 and/or secondary preferred cell). The management notification may include a measurement report.

In some examples, the cell mode system 105 (e.g., gNodeB or eNodeB) may generate a cell switch request based on the preferred cell mode request and/or the management notification. As used herein, the term "cell switch request" may be used to refer to or otherwise include at least one of a pCell switch request, sCell switch request, or any other suitable switch request that identifies at least one preferred cell that a user device may be communicatively coupled to for adjustment of an uplink data speed, downlink data speed, or any other suitable parameter. The cell switch request may include, for example, a pCell switching inquiry. Alternatively or additionally, the cell switch request may take the form of or otherwise include a X2 message. The cell switch request may cause handover of the user device 120 from the cell mode system 105 (e.g., gNodeB or eNodeB) to a preferred cell (e.g., a preferred pCell such as the cell 340) using the X2 message.

In some embodiments, the cell mode system 105 may provide the cell switch request to at least one preferred cell. The at least one preferred cell may include the first preferred cell (e.g., the preferred pCell such as the cell 340). Alternatively or additionally, a preferred cell may retrieve the cell switch request from the cell mode system 105. The first preferred cell may accept the cell switch request or reject the cell switch request. If the first preferred cell (e.g., a preferred pCell) accepts the cell switch request, the first preferred cell may provide a cell switch confirmation to the cell mode system 105. Accordingly, the cell mode system 105 (e.g., gNodeB or eNodeB) may receive the cell switch confirmation based on the cell switch request.

If the first preferred cell (e.g., a preferred pCell or sCell) rejects the cell switch request, the first preferred cell may provide a cell switch rejection to the cell mode system 105. In this regard, the cell mode system 105 may receive the cell switch rejection based on the cell switch request. In turn, the cell mode system 105 may be structured to provide the cell switch request to a secondary preferred cell (e.g., a preferred pCell or sCell). In some examples, the cell mode system 105 may deny the cell switch confirmation. For example, the cell mode system 105 may deny the cell switch confirmation when the preferred cell lacks capacity (e.g., the preferred cell is overloaded) to connect to another user device (e.g., the user device 120) such that the cell mode system 105 cannot allow a new user device connection. Alternatively or additionally, the secondary preferred cell (e.g., a secondary most preferred pCell) may be granted if the user device 120 includes the secondary preferred cell in the measurement notification (e.g., a measurement report), the preferred cell mode request (e.g., preferred pCell), or a combination thereof. For example, the secondary preferred cell may be granted if the user device 120 transmits the measurement notification (e.g., a measurement report) and/or the preferred cell mode request (e.g., preferred pCell) carried via the signal protocol (e.g., radio resource control (RRC) signaling, RRC message, etc.) as described herein with reference to FIG. 2.

In some embodiments, the cell mode system 105 may provide a handoff request responsive to the cell switch confirmation. The handoff request may be structured to initiate the handoff of the user device (e.g., the user device 120) to at least one preferred cell. The cell mode system 105 may grant the cell switch request by initiating the handoff request (e.g., handover procedure) or any other suitable signal protocol (e.g., radio resource control (RRC) procedure). The at least one preferred cell (e.g., the preferred pCell such as the cell 340) may adjust an uplink data speed of the user device. In some embodiments, the at least one preferred cell may adjust a downlink data speed of the user device.

Advantageously, the user device 120 is communicatively coupled to the preferred cell (e.g., the first preferred cell and/or secondary preferred cell) responsive to the hand off request provided to or otherwise retrieved by the user device such that the uplink data speed and/or downlink data speed of the user device is adjusted.

Figure 4:
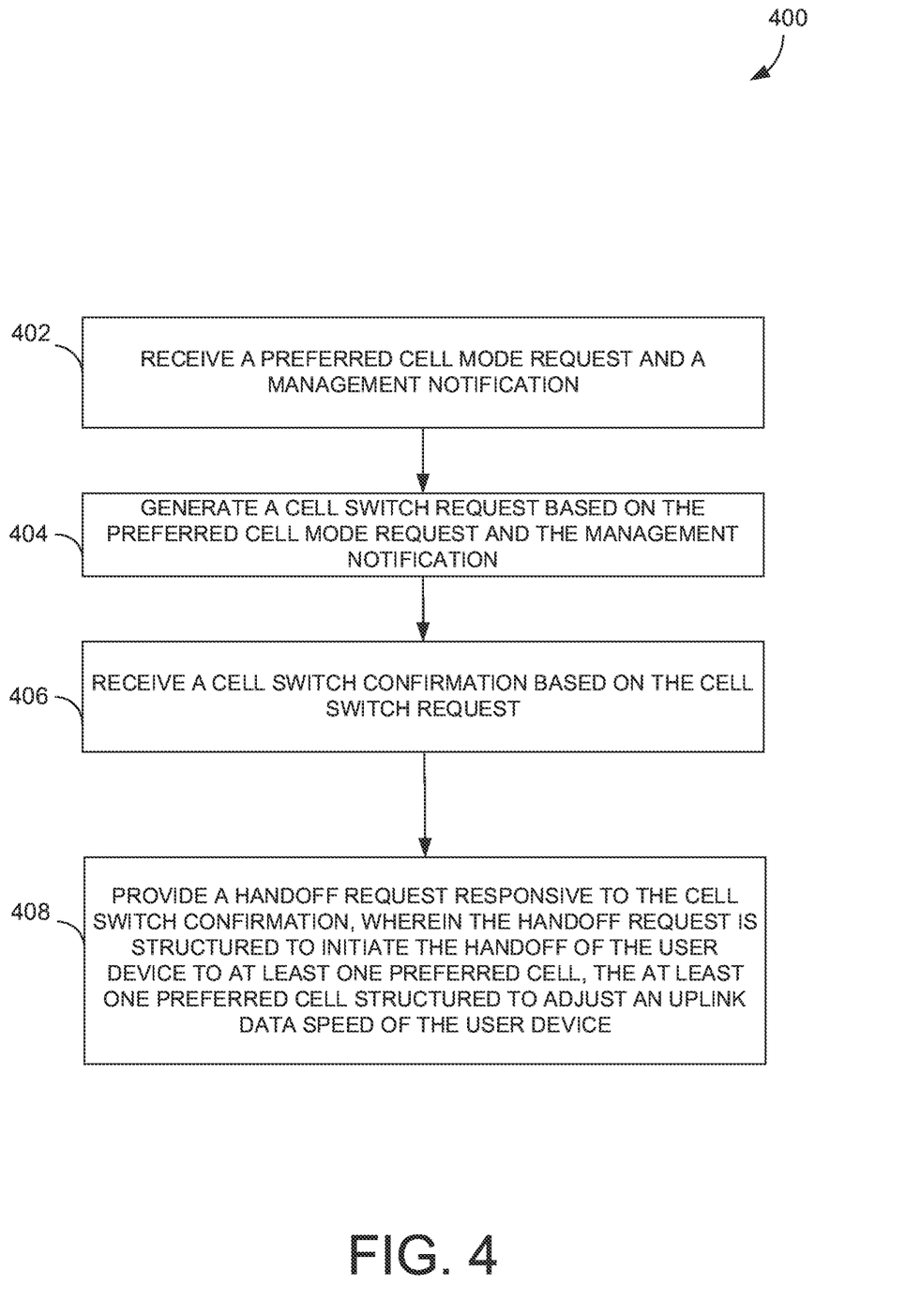
FIG. 4 depicts a flowchart of an exemplary method for supporting a preferred cell mode of a telecommunications network in accordance with an example embodiment.

FIG. 4 depicts a flow diagram of an exemplary method 400 for supporting a preferred cell mode of a user device operable via a telecommunications network in accordance with implementations of the present disclosure. Initially at block 402 a preferred cell mode request and a management notification are received by a cell mode system. The preferred cell mode request may include a first preferred cell and/or secondary preferred cell. The management notification may include a measurement report.

At block 404, a cell switch request is generated based on the preferred cell mode request and the management notification. The cell switch request may include a pCell switch request, sCell switch request, any other suitable switch request, or combination thereof that identifies a preferred cell that a user device may be communicatively coupled to for adjustment of an uplink data speed, downlink data speed, or any other suitable parameter. The cell switch request may cause handover of the user device from the cell mode system to the preferred cell. The cell mode system may provide the cell switch request to at least one preferred cell. The preferred cell may accept the cell switch request or reject the cell switch request.

At block 408, a cell switch confirmation is received based on the cell switch request. If the first preferred cell (e.g., a preferred pCell) accepts the cell switch request, the first preferred cell may provide a cell switch confirmation to the cell mode system. If the first preferred cell rejects the cell switch request, the first preferred cell may provide a cell switch rejection to the cell mode system. The user device may be accepted by a secondary preferred cell if the measurement notification (e.g., a measurement report), the preferred cell mode request (e.g., preferred pCell), or a combination thereof includes the secondary preferred cell.

At block 410, a handoff request is provided in response to the cell switch confirmation. The handoff request is structured to initiate the handoff of the user device to at least one preferred cell. The at least one preferred cell (e.g., the preferred pCell) may adjust the uplink data speed and/or downlink data speed of the user device.

Figure 5:
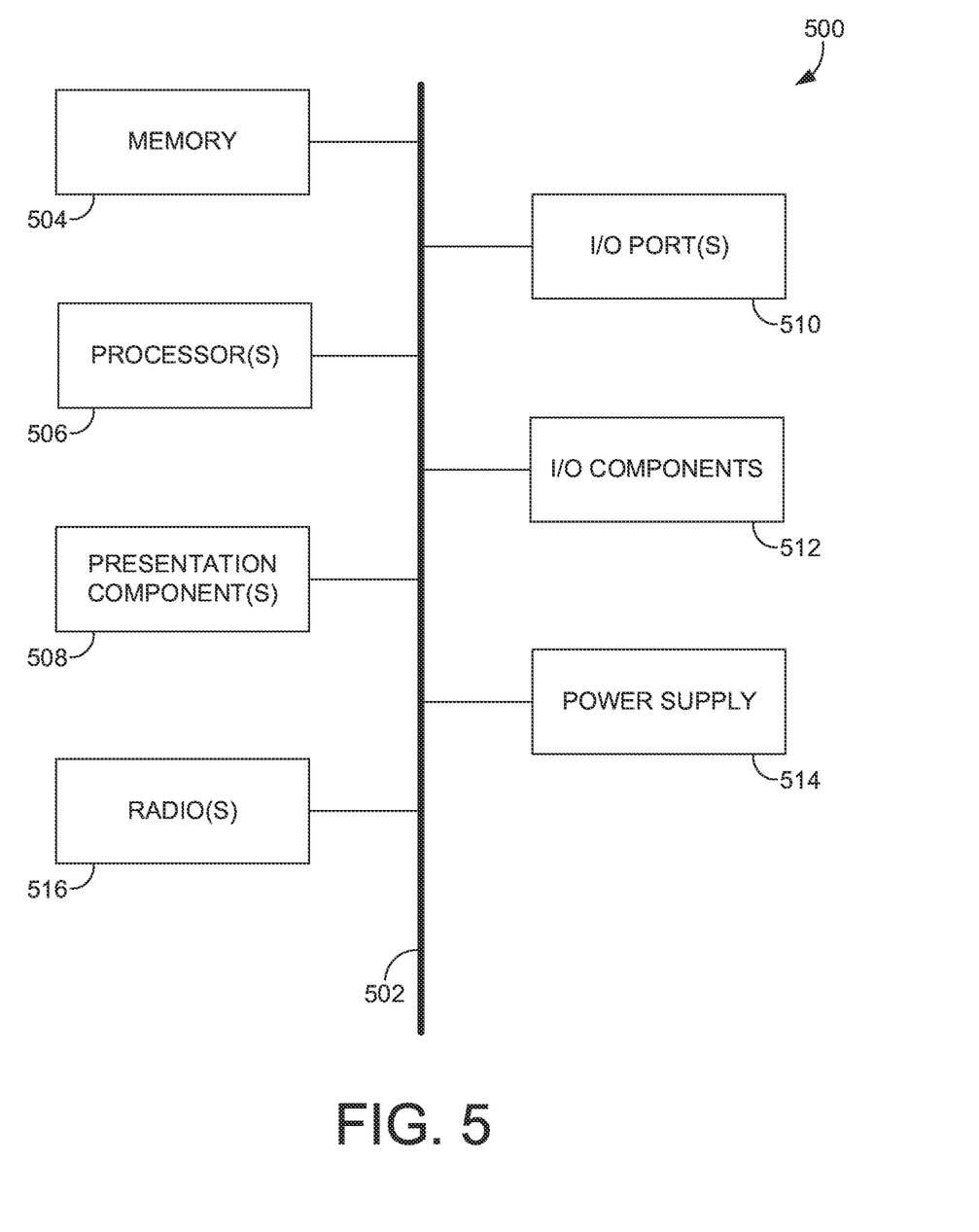
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for supporting a preferred cell mode of a user device operable via a telecommunications network, the method comprising:
receiving, by a cell mode system communicatively coupled to a user device, a preferred cell mode request and a management notification responsive to a determination of a preferred cell update after a timer expiration corresponding to the user device;
generating, by the cell mode system, a cell switch request based on the preferred cell mode request and the management notification;
receiving a cell switch confirmation based on the cell switch request; and
providing a handoff request responsive to the cell switch confirmation, wherein the handoff request is structured to initiate the handoff of the user device to at least one preferred cell, the at least one preferred cell structured to adjust an uplink data speed of the user device.

2. The method of claim 1, wherein the cell switch request comprises at least one of a pCell switch request or a sCell switch request.

3. The method of claim 1, wherein the cell mode system is structured to provide a candidate list.

4. The method of claim 3, wherein the candidate list comprises a carrier aggregation candidate list.

5. The method of claim 3, wherein a system information message comprises the candidate list transmitted.

6. The method of claim 1, wherein the cell mode system is structured to provide the cell switch request to a first preferred cell, the at least one preferred cell comprising the first preferred cell.

7. The method of claim 6, wherein the cell mode system is structured to receive a cell switch rejection based on the cell switch request, and wherein the cell mode system is structured to provide the cell switch request to a secondary preferred cell, the at least one preferred cell comprising the secondary preferred cell.

8. The method of claim 1, wherein the at least one preferred cell is structured to adjust a downlink data speed.

9. The method of claim 1, wherein the cell mode system comprises a gNodeB or an eNodeB, wherein a telecommunications network comprises a cell site, and wherein the cell site is operable based on at least one of a 4G network, E-UTRAN New Radio-Dual Connectivity (EN-DC) network, or 5G network.

10. The method of claim 9, wherein the cell site comprises the cell mode system.

11. Computer-readable storage media having computer-executable instructions embodied thereon that, when executed by one or more processors, cause the one or more processors to:
receive, by one or more user devices communicatively coupled to a cell mode system, a candidate list comprising one or more carriers, the one or more carriers corresponding to one or more cells;
determine at least one preferred cell based on the candidate list responsive to a determination of a preferred cell update within a period of time corresponding to a timer of the user device, the at least one preferred cell structured to adjust an uplink data speed;
determine whether a first preferred cell from the at least one preferred cell matches a current cell;
generate a management notification corresponding to the first preferred cell if the first preferred cell does not match the current cell; and
transmit the management notification and a preferred cell mode request, wherein the preferred cell mode request comprises the first preferred cell.

12. The computer-readable storage media of claim 11, wherein the at least one preferred cell is structured to adjust a downlink data speed.

13. The computer-readable storage media of claim 11, wherein the preferred cell mode request comprises a secondary preferred cell.

14. The computer-readable storage media of claim 11, wherein the at least one preferred cell comprises at least one of pCell or sCell.

15. The computer-readable storage media of claim 11, wherein the management notification comprises a measurement report.

16. A system for supporting a preferred cell mode of a telecommunications network, the system comprising:
- a user device; and
- a cell site comprising a cell mode system communicatively coupled to the user device, the cell site structured to:
- receive, by the cell mode system communicatively coupled to the user device, a preferred cell mode request and a management notification responsive to a determination of a preferred cell update after a timer expiration corresponding to the user device;
- generate a cell switch request based on the preferred cell mode request and the management notification;
- receive a cell switch confirmation based on the cell switch request; and
- provide a handoff request responsive to the cell switch confirmation, wherein the handoff request is structured to initiate the handoff of the user device to at least one preferred cell, the at least one preferred cell structured to adjust an uplink data speed.

17. The system of claim 16, wherein the cell switch request comprises at least one of a pCell switch request or sCell switch request.

18. The system of claim 16, wherein the cell mode system is structured to provide the cell switch request to a first preferred cell, the at least one preferred cell comprising the first preferred cell.

19. The system of claim 16, wherein the at least one preferred cell is structured to adjust a downlink data speed.

20. The system of claim 16, wherein the preferred cell mode request comprises at least one of a first preferred cell or a secondary preferred cell.

* * * * *